United States Patent
Lortz et al.

(10) Patent No.: US 8,399,093 B2
(45) Date of Patent: Mar. 19, 2013

(54) PROCESS FOR PREPARING REDISPERSIBLE SURFACE-MODIFIED SILICON DIOXIDE PARTICLES

(75) Inventors: Wolfgang Lortz, Waechtersbach (DE); Gabriele Perlet, Grosskrotzenburg (DE); Uwe Diener, Grosskrotzenburg (DE); Sascha Reitz, Hanau (DE)

(73) Assignee: Evonik Degussa GmbH, Essen (DE)

( * ) Notice: Subject to any disclaimer, the term of this patent is extended or adjusted under 35 U.S.C. 154(b) by 56 days.

(21) Appl. No.: 12/996,936

(22) PCT Filed: Jun. 2, 2009

(86) PCT No.: PCT/EP2009/056733
§ 371 (c)(1),
(2), (4) Date: Dec. 8, 2010

(87) PCT Pub. No.: WO2010/006837
PCT Pub. Date: Jan. 21, 2010

(65) Prior Publication Data
US 2011/0086958 A1   Apr. 14, 2011

(30) Foreign Application Priority Data
Jul. 18, 2008  (EP) ..................... 08160715

(51) Int. Cl.
*B32B 18/00* (2006.01)
*B02C 19/06* (2006.01)
(52) U.S. Cl. .......... 428/405; 241/15; 241/21; 366/162.4
(58) Field of Classification Search ........................ None
See application file for complete search history.

(56) References Cited

U.S. PATENT DOCUMENTS

| | | | | |
|---|---|---|---|---|
| 5,321,058 A * | 6/1994 | Fuchigami et al. | ............ | 523/211 |
| 6,020,419 A * | 2/2000 | Bock et al. | .................... | 524/590 |
| 6,994,834 B1 * | 2/2006 | Shirono et al. | ............... | 423/335 |
| 7,300,969 B2 * | 11/2007 | Nakano et al. | ............... | 524/492 |
| 7,588,698 B2 * | 9/2009 | Toshioka et al. | ............. | 252/500 |
| 8,092,587 B2 * | 1/2012 | Zschunke et al. | ............. | 106/482 |
| 2003/0131761 A1 | 7/2003 | Hayashi et al. | | |
| 2004/0034144 A1 | 2/2004 | Scharfe et al. | | |
| 2005/0011409 A1 | 1/2005 | Isobe | | |
| 2006/0112860 A1 | 6/2006 | Yoshitake et al. | | |
| 2006/0134543 A1 * | 6/2006 | Kashiwabara et al. | .... | 430/109.3 |
| 2006/0163533 A1 | 7/2006 | Batz-Sohn et al. | | |
| 2006/0171872 A1 * | 8/2006 | Adams | .......................... | 423/335 |
| 2006/0266258 A1 * | 11/2006 | Asakura et al. | .................... | 106/2 |
| 2007/0259176 A1 | 11/2007 | Deng et al. | | |

FOREIGN PATENT DOCUMENTS

| | | | |
|---|---|---|---|
| EP | 1 331 254 | | 7/2003 |
| EP | 1 657 283 | | 5/2006 |
| JP | 2004-075459 | * | 3/2004 |
| WO | 2005 123578 | | 12/2005 |
| WO | WO 2006/064678 | * | 6/2006 |

OTHER PUBLICATIONS

Machine-generated translation of JP 2004-075459 into English.*
Abstract for JP 2002-145609 A (May 2002).*
Abstract for JP 2008-137854 A (Jun. 2008).*
International Search Report issued Feb. 1, 2010 in PCT/EP09/56733 filed Jun. 2, 2009.
Seekkuarachchi, N. Isuru et al., "Dispersion mechanism of nanoparticlate aggregates using a high pressure wet-type jet mill", Chemical Engineering Science, vol. 63, No. 9, pp. 2341-2366, (May 1, 2008).

* cited by examiner

*Primary Examiner* — Marc Zimmer
(74) *Attorney, Agent, or Firm* — Oblon, Spivak, McClelland, Maier & Neustadt, L.L.P.

(57) ABSTRACT

Provided is a process for preparing surface-modified silicon dioxide particles with a mean particle diameter of at most 100 nm, involving (A) high-pressure grinding of a predispersion having (i) surface-modified silicon dioxide particles which are at least partly aggregated, are bonded to the surface-modifying component via Si—O—Si bonds, and still have reactive groups on their surface; (ii) an organosilicon compound which has a silicon-carbon bond and a functional group which can react with the reactive groups to form a covalent Si—O—Si bond; and (iii) a solvent, to form a dispersion; and (B) removing the liquid phase of the dispersion. Also provided are redispersible, surface-modified silicon dioxide particles obtained by this process, and their use in toner powders, silicone rubber, adhesives, and scratch-resistance surface coatings.

17 Claims, No Drawings

PROCESS FOR PREPARING REDISPERSIBLE SURFACE-MODIFIED SILICON DIOXIDE PARTICLES

CROSS REFERENCE TO RELATED APPLICATIONS

The present application is the national stage of international application PCT/EP2009/056733, filed on Jun. 2, 2009, and claims the benefit of the filing date of European Application No. 08 160 715.2, filed on Jul. 18, 2008.

The invention relates to a process for preparing surface-modified redispersible silicon dioxide particles, to the particles themselves and to the use thereof.

Surface-modified silicon dioxide particles can be used in a multitude of applications, especially in toner compositions, as fillers and as a constituent of coating materials. Surface-modified silicon dioxide particles are obtained by reacting silicon dioxide particles which bear reactive groups, such as silanol groups, on their surface with a surface modifier. According to the type of modifier, the result may be predominantly hydrophobic or predominantly hydrophilic particles.

Useful silicon dioxide particles include both the particles prepared by wet-chemical processes, and those which have been prepared by gas phase processes. Especially silicon dioxide particles prepared by gas phase processes tend to form aggregates and agglomerates. A surface modification does not make any difference to these structures.

In order to obtain smaller surface-modified particles, attempts are being made to perform the modification in dispersions which comprise hydrophilic silicon dioxide particles. By means of suitable dispersion techniques, it is possible to prepare dispersions whose mean diameter is less than 100 nm.

In WO 2006/045012, an aqueous dispersion of silicon dioxide particles is reacted with silylamines. Removal of the liquid phase and subsequent drying allows the surface-modified silicon dioxide particles to be isolated.

EP-B-1657283 discloses a quite complicated process for preparing surface-modified silicon dioxide particles, which comprises a hydrophobizing treatment step, the reaction of a disilazane with an aqueous silica sol, and a subsequent phase separation step, in which addition of a disilazane or siloxane at elevated temperature achieves a phase separation.

These processes have several disadvantages.

For instance, the surface modifiers are restricted to silylamines.

The performance of the reaction in an aqueous phase leads to the effect that the degree of hydrophobization in the case of hydrophobic products is limited.

The achievable particle size depends on the particle size of the silicon dioxide particles used. For instance, more highly aggregated silicon dioxide particles lead to even larger surface-modified silicon dioxide particles.

The surface-modified silicon dioxide particles obtained after the removal of the liquid phase are not redispersible as such, but rather have to be comminuted further in a subsequent step.

The combination has the effect that parts of the surface are not surface-modified.

It was an object of the present invention to provide a process in which these disadvantages are reduced or avoided entirely.

The invention provides a process for preparing surface-modified silicon dioxide particles with a mean particle diameter of at most 100 nm, comprising the steps of a) providing a predispersion
b) high-pressure grinding of the predispersion to form a dispersion
c) removing the liquid phase of the dispersion, the predispersion comprising
a1) surface-modified silicon dioxide particles which
  are at least partly aggregated,
  are bonded to the surface-modifying component via Si—O—Si bonds and
  still have reactive groups on their surface,
a2) one or more organosilicon compounds which
  have at least one silicon-carbon bond and
  at least one functional group which can react with the reactive groups to form a covalent Si—O—Si bond, and
a3) one or more solvents.

The reactive groups on the particle surface are those which are already present on the particles used and those which are formed during the dispersing operation. The reactive groups are predominantly or exclusively OH groups. The reactive groups on the surface of the surface-modified silicon dioxide particles used may react fully or only partly with the organosilicon compounds. They may react partly because, for example, individual reactive groups are sterically inaccessible as a result of the screening of the surface-modifying compounds.

In the process according to the invention, at least a portion of the surface-modified silicon dioxide particles used is present in the form of aggregates. "A portion" is understood to mean that the proportion of aggregated particles is at least 5% by weight, based on the sum of the aggregates and nonaggregated particles; according to the present invention, these are primary particles. Preference is given, however, to using particles which are present in very substantially aggregated form, i.e. to an extent of at least 80% by weight, generally to an extent of at least 90% by weight, based on the sum of the aggregates and nonaggregated particles. The proportions can be determined, for example, by counting of TEM images (TEM=Transmission Electron Microscopy).

Aggregates are understood to mean solid primary particles connected, for example, via sinter necks. The aggregates in turn may combine to form agglomerates, in which the aggregate are only loosely bonded to one another. Agglomerates can be cleaved again merely by introduction of low shearing energies.

The mean particle diameter of the particles present in the dispersion after the high-pressure grinding, including aggregates and primary particles, is at most 100 nm. It is preferably 50 to 100 nm, more preferably 60 to 90 nm.

The mean particle diameter of the particles present in the predispersion is greater than 100 nm. The mean particle diameter may be 200 nm to several hundred micrometers and includes primary particles, aggregates and also agglomerates. Usually, the particle diameter is 10 to 500 µm. It can be determined, for example, by dynamic light scattering. The predispersion can be prepared at significantly lower shear rates than the dispersion. For example, simple stirrers, dissolvers or rotor/stator machines can be used. The predispersion principally serves the purpose of disbanding any agglomerates of surface-modified silicon dioxide particles, which can arise through the combination of aggregates via cohesive forces.

The surface-modified silicon dioxide particles present in the predispersion may have either hydrophilic or hydrophobic properties.

One measure for the degree of the surface properties, hydrophilic to hydrophobic, is that of the methanol wettability. In the determination of the methanol wettability, in each case 0.2 g (±0.005 g) of hydrophobic silicon dioxide particles is weighed into transparent centrifuge tubes. 8.0 ml of a methanol/water mixture with in each case 10, 20, 30, 40, 50, 60, 70 and 80% by volume of methanol are added to each weighed sample. The closed tubes are shaken for 30 seconds and then centrifuged at 2500 min$^{-1}$ for 5 minutes. The sediment volumes are read off, converted to percent and plotted graphically against the methanol content (% by volume). The turning point of the curve corresponds to the methanol wettability. The higher the methanol wettability, the greater the hydrophobicity of the silicon dioxide particles. The methanol wettability of the surface-modified silicon dioxide particles used is preferably 20 to 90, more preferably 40 to 80.

In the process according to the invention, it is possible in principle to use all surface-modified silicon dioxide particles, provided that they are at least partly aggregated, are bonded to the surface-modifying component via Si—O—Si bonds, and still have reactive groups on their surface. The BET surface area of these particles is generally 30 to 400 m$^2$/g, preferably 80 to 350 m$^2$/g and more preferably 150 to 270 m$^2$/g.

In particular, it is possible to use surface-modified silicon dioxide particles which have been obtained by surface modification of fumed silicon dioxide particles, i.e. those obtained by flame hydrolysis or flame oxidation. It is also possible to use subsequently surface-modified types. The structure of the surface-modified silicon dioxide particles can be modified by mechanical action and possible subsequent grinding. The structure can be modified, for example, with a ball mill or a continuous ball mill. The subsequent grinding can be effected, for example, by means of an airjet mill, toothed-disc mill or pin mill. The structure modification is also described in EP-A-808880 and DE-A-102006048509.

The agents used to prepare the surface-modified silicon dioxide particles present in the predispersion are those which have at least one functional group which can form an Si—O—Si bond with the reactive groups on the particles surface of the silicon dioxide particles to be modified.

In addition to the functional group which can enter into a chemical bond with the surface group of the particle, the modifier generally has a molecular radical which, after joining of the surface modifier, can impart more or less hydrophobic or hydrophilic properties to the particle.

Surface modifiers used with preference in the preparation of the surface-modified silicon dioxide particles used are silanes. The carbon chains of these compounds may be interrupted by O, S, or NH groups. It is possible to use one or more modifiers. The silanes used have at least one unhydrolysable group.

Preferred silanes have the general formula $R_xSiY_{4-x}$ (I) in which x has the value of 1, 2 or 3 and the R radicals are the same or different and are each unhydrolysable groups, the Y radicals are the same or different and are each hydrolysable groups or hydroxyl groups.

In the general formula (I), the hydrolysable Y groups, which may be the same or different, are, for example,
hydrogen,
halogen, for example F, Cl, Br or I,
alkoxy, preferably $C_1$-$C_6$-alkoxy, such as methoxy, ethoxy, n-propoxy, i-propoxy and butoxy,
aryloxy, preferably $C_6$-$C_{10}$-aryloxy, such as phenoxy,
acyloxy, preferably $C_1$-$C_6$-acyloxy, such as acetoxy or propionyloxy,
alkylcarbonyl, preferably $C_2$-$C_7$-alkylcarbonyl, such as acetyl.

Preferred hydrolysable radicals are halogen, alkoxy groups and acyloxy groups. Particularly preferred hydrolysable radicals are $C_1$-$C_4$-alkoxy groups, especially methoxy and ethoxy.

The unhydrolysable R radicals, which may be the same or different, are R radicals with or without a functional group.

The unhydrolysable R radical without a functional group is, for example,
alkyl, preferably $C_1$-$C_8$-alkyl, such as methyl, ethyl, n-propyl, isopropyl, n-butyl, sec-butyl and tert-butyl, pentyl, hexyl, octyl or cyclohexyl; substituted alkyl.
alkenyl, preferably $C_2$-$C_6$-alkenyl, such as vinyl, 1-propenyl, 2-propenyl and butenyl,
alkynyl, preferably $C_2$-$C_6$-alkynyl, such as acetylenyl and propargyl,
aryl, preferably $C_6$-$C_{10}$-aryl, such as phenyl and naphthyl, and corresponding alkaryls and aralkyls such as tolyl, benzyl and phenethyl.

Preferred surface modifiers may especially be $CH_3SiCl_3$, $CH_3Si(OC_2H_5)_3$, $CH_3Si(OCH_3)_3$, $C_2H_5SiCl_3$, $C_2H_5Si(OC_2H_5)_3$, $C_2H_5Si(OCH_3)_3$, $C_3H_7Si(OC_2H_5)_3$, $(C_2H_5O)_3SiC_3H_6Cl$, $(CH_3)_2SiCl_2$, $(CH_3)_2Si(OC_2H_5)_2$, $(CH_3)_2Si(OH)_2$, $C_6H_5Si(OCH_3)_3$, $C_{1-6}H(Si(OC_2H_5)_3$, $C_{1-6}H_5CH_2CH_2Si(OCH_3)_3$, $(C_6H_5)_2SiCl_2$, $(C_{1-6}H_5)_2Si(OC_2H_5)_2$, $(i\text{-}C_3H_7)_3SiOH$, $CH_2=CHSi(OOCCH_3)_3$, $CH_2=CHSiCl_3$, $CH=CH-Si(OC_2H_5)_3$, $CH_2=CHSi(OC_2H_5)_3$, $CH_2=CH-Si(OC_2H_4OCH_3)_3$, $CH_2=CH-CH_2-Si(OC_2H_5)_3$, $CH_2=CH-CH_2-Si(OC_2H_5)_3$, $CH_2=CH-CH_2-Si(OOCCH_3)_3$, n-$C_6H_{13}$-$CH_2$-$CH_2$-Si$(OC_2H_5)_3$, and n-$C_8H_{12}$-$CH_2$-$CH_2$-Si$(OC_2H_5)_3$.

An unhydrolysable R radical with a functional group may, for example, comprise, as a functional group, an epoxy (such as glycidyl or glycidyloxy), hydroxyl, ether, amino, monoalkylamino, dialkylamino, optionally substituted anilino, amide, carboxyl, acryloyl, acryloyloxy, methacryloyl, methacryloyloxy, mercapto, cyano, alkoxy, isocyanato, aldehyde, alkylcarbonyl, acid anhydride or phosphoric acid group.

Preferred examples of unhydrolysable R radicals with functional groups are a
glycidyl or a glycidyloxy-($C_1$-$C_{20}$)-alkylene radical, such as beta-glycidyloxyethyl, gamma-glycidyloxypropyl, delta-glycidyloxybutyl, epsilon-glycidyloxypentyl, omega-glycidyloxyhexyl and 2-(3,4-epoxycyclohexyl)-ethyl,
(meth)acryloyloxy-($C_1$-$C_6$)-alkylene radical, such as (meth) acryloyloxymethyl, (meth) acryloyloxyethyl, (meth)acryloyloxypropyl or (meth)acryloyloxybutyl, and
3-isocyanatopropyl radical.

Specific surface modifiers which may be used are gamma-glycidyloxypropyltrimethoxysilane, glycidyloxypropyltriethoxysilane, 3-isocyanatopropyltriethoxysilane, 3-isocyanatopropyldimethylchlorosilane, aminopropyltriethoxysilane, aminopropyltrimethoxysilane, aminomethyltriethoxysilane, aminomethyltrimethoxysilane, aminopropyltrichlorosilane, (N-cyclohexylaminomethyl)triethoxysilane, 2-aminoethyl-3-aminopropyltrimethoxysilane, N-(n-butyl)-3-aminopropyltrimethoxysilane, 2-aminoethyl-3-aminopropylmethyldimethoxysilane, (3-aminopropyl)diethoxymethylsilane, (3-aminopropyl)ethyldiethoxysilane, (3-methylaminopropyl)trimethoxysilane, (aminoethylaminomethyl)phenethyltrimethoxysilane, (N,N-diethyl-3-aminopropyl)trimethoxysilane, (N,N-dimethylamino)dimethylchlorosilane, (N,N-dimethylaminopropyl)trimethoxysilane, (N-acetylglycyl)-3- aminopropyltrimethoxysilane, (N-cyclohexylaminomethyl)methyldiethoxysilane, (N-cyclohexylaminomethyl)triethoxysilane, (N-phenylaminomethyl)methyldimethoxysilane, (N-phenylaminomethyl)trimethoxysilane, 11-aminoundecyltriethoxysilane, 3-(1,3-dimethylbutylidene)aminopropyltriethoxysilane, 3-(1-aminopropoxy)-3,3-dimethyl-1-propenyltrimethoxy silane, 3-(2,4-dinitrophenylamino)propyltriethoxysilane, 3-(2-aminoethylamino)propylmethyldimethoxysilane, 3-(2-aminoethylamino)propyltrimethoxysilane, 3-(cyclohexylamino)propyltrimethoxysilane, 3-(aminophenoxy)propyltrimethoxysilane, 3-(N-allylamino)propyltrimethoxysilane, 3-(N-styrylmethyl-2-aminoethylamino)propyltrimethoxy silane, 3-(phenylamino)propyltrimethoxysilane, 3-aminopropyldiisopropylethoxysilane, 3-aminopropyldimethylethoxysilane, 3-aminopropylmethylbis(trimethylsiloxy)silane, 3-aminopropylmethyldiethoxysilane, 3-aminopropyltris(methoxyethoxyethoxy)silane, 3-aminopropyltris(trimethylsiloxy)silane, 4-aminobutyltriethoxysilane, aminophenyltrimethoxysilane, bis(2-hydroxyethyl)-3-aminopropyltriethoxysilane, diethylaminomethyltriethoxysilane, N,N-dimethylaminomethylethoxysilane, N-(2-aminoethyl)-3-aminoisobutyldimethylmethoxysilane, N-(2-aminoethyl)-3-aminopropylmethyldimethoxysilane, N-(2-aminoethyl)-3-aminopropyltriethoxysilane, N-(2-aminoethyl)-3-aminopropyltrimethoxysilane, N-(2-aminomethyl)-11-aminoundecyltrimethoxysilane, N-(3-acryloyloxy-2-hydroxypropyl)-3-aminopropyltriethoxy silane, N-(3-methacryloyloxy-2-hydroxypropyl)-3-aminopropyl triethoxysilane, N-(6-aminohexyl)aminopropyltrimethoxysilane, N-(hydroxyethyl)-N-methylaminopropyltrimethoxysilane, N-3-[(amino(polypropyleneoxy)]aminopropyltrimethoxysilane, n-butylaminopropyltrimethoxysilane, N-cyclohexylaminopropyltrimethoxysilane, N-ethylaminoisobutylmethyldiethoxysilane, N-ethylaminoisobutyltrimethoxysilane, N-methylaminopropylmethyldimethoxysilane, N-methylaminopropyltrimethoxysilane, N-phenylaminomethyltriethoxysilane, phenylbis(dimethylamino)chlorosilane, tert-butylaminopropyltrimethoxysilane, aminopropylsilanetriol, N-(2-aminoethyl)-3-aminopropylsilanetriol, N-cyclohexylaminomethyltriethoxysilane, N-cyclohexylaminomethylmethyldiethoxysilane and N-phenylaminomethyltrimethoxysilane, 3-(meth)acryloyloxypropyltriethoxysilane and 3-(meth)acryloyloxypropyltrimethoxysilane.

In addition, the silicon dioxide particles present in the predispersion can also be surface-modified by silylamines. Silylamines are understood to mean compounds which have at least one Si—N bond and which can react with the Si—OH groups present on the surface of the silicon dioxide particles. Examples thereof are vinyldimethylsilylamine, octyldimethylsilylamine, phenyldimethylsilylamine, bis(dimethylaminodimethylsilyl)ethane, hexamethyldisilazane, (N,N-dimethylamino)trimethylsilane and bis(trifluoropropyl)tetramethyldisilazane. It is also possible to use cyclic silazanes.

Suitable surface modifiers are also the cyclic polysiloxanes D3, D4, D5 and homologues thereof, D3, D4 and D5 being understood to mean cyclic polysiloxanes having 3, 4 or 5 units of the —O—Si($CH_3$)$_2$ type, for example octamethylcyclotetrasiloxane=D4.

And also polysiloxanes or silicone oils of the Y—O—[(RR'SiO)$_m$—(R"R'''SiO)$_n$]$_u$—Y type, where m=0, 1, 2, 3, ... ∞, preferably 0, 1, 2, 3, ... 100 000, n=0, 1, 2, 3, ... ∞, preferably 0, 1, 2, 3, ... 100 000, u=0, 1, 2, 3, ... ∞, preferably 0, 1, 2, 3, ... 100 000, Y=$CH_3$, H, $C_nH_{2n+1}$, n=2-20; Si($CH_3$)$_3$, Si($CH_3$)$_2$H, Si($CH_3$)$_2$OH, Si($CH_3$)$_2$(O$CH_3$), Si($CH_3$)$_2$($C_nH_{2n+1}$), n=2-20

R, R', R", R''', are each independently alkyl such as $C_nH_{2n+1}$, n=1-20; aryl such as phenyl radicals and substituted phenyl radicals, ($CH_2$)$_n$—$NH_2$, H. Polysiloxanes or silicone oils are usually thermally activated for surface modification.

Suitable surface-modified silicon dioxide particles which can be used in the predispersion are the commercially available materials AEROSIL®R104, AEROSIL®R106, AEROSIL® R202, AEROSIL® R805, AEROSIL®R812, AEROSIL®R812 S, AEROSIL®R972, AEROSIL® R974, AEROSIL® R8200, AEROXIDE® LE-1 and AEROXIDE® LE-2, AEROSIL®R 9200, AEROSIL®R 8200 and AEROSIL® R 7200, all Evonik Degussa.

The proportion of the surface-modified silicon dioxide particles used, based on the predispersion, depends upon factors including the type of modification of the particles, of the solvent and of the organosilicon compound. In general, the proportion will be within a range from 1 to 50% by weight. Preference is given to a range from 10 to 40% by weight, particular preference to a range from 15 to 30% by weight.

The predispersion further comprises one or more organosilicon compounds which have at least one silicon-carbon bond and at least one functional group which can react with the reactive groups of the silicon dioxide particles to form a covalent Si—O—Si bond.

The organosilicon compounds are the same compounds which have also been specified as surface modifiers for preparing the surface-modified silicon dioxide particles used in the process according to the invention.

The best results are obtained with silanes of the general formula $R_xSiY_{4-x}$ (I) in which the unhydrolysable radical does not bear any functional groups, for example trimethylchlorosilane and trimethylethoxysilane. Silylamines are also particularly suitable. Mention should be made here especially of hexamethyldisilazane and (N,N-dimethylamino)trimethylsilane.

In principle, the surface modifier which has been used to prepare the silicon dioxide particles present in the predispersion and the organosilicon compound may be the same or different. For example, the predispersion, in accordance with the present invention, may comprise surface-modified silicon dioxide particles which have been obtained from the reaction of silicon dioxide particles with hexamethyldisilazane and, as the organosilicon compound, hexamethyldisilazane. It is equally possible that the predispersion, in accordance with the present invention, comprises surface-modified silicon dioxide particles which have been obtained from the reaction of silicon dioxide particles with dimethyldichlorosilane and, as the organosilicon compound, hexamethyldisilazane.

The proportion of organosilicon compound, based on the surface-modified silicon dioxide particles used, is preferably from 0.01 to 10% by weight and more preferably from 0.1 to 3% by weight. When a complete conversion of the organosilicon compound is considered to be important, the necessary proportion can be determined by preliminary tests, by, for example, separating liquid and solid phases by means of an ultracentrifuge and determining the concentration of the organosilicon compound in the solution.

In addition, the predispersion used in the process according to the invention has a liquid phase which comprises one or more solvents and one or more silicon compounds.

The solvents are generally organic. Preference may be given to alkanes, aromatics, alcohols, monoalkyl ethers of polyols, esters, ethers and ketones.

Suitable alkanes and aromatics may be: pentane, hexane, heptane, octane, isooctane, petroleum ether, benzene, toluene, xylene, mixtures of aromatics.

Suitable alcohols may be: methanol, ethanol, n-propanol, i-propanol, n-butanol, i-butanol, sec-butanol, tert-butanol, n-pentanol, i-pentanol, 2-methylbutanol, sec-pentanol, tert-pentanol, 3-methoxybutanol, n-hexanol, 2-methylpentanol, sec-hexanol, 2-ethylbutanol, sec-heptanol, 3-heptanol, n-octanol, 2-ethylhexanol, sec-octanol, n-nonyl alcohol, 2,6-dimethylheptanol-4, n-decanol, sec-undecyl alcohol, trimethylnonyl alcohol, sec-tetradecyl alcohol, sec-heptadecyl alcohol, phenol, cyclohexanol, methylcyclohexanol, 3,3,5-trimethylcyclohexanol, benzyl alcohol, diacetone alcohol, ethylene glycol, 1,2-propylene glycol, 1,3-butylene glycol, 2,4-pentanediol, 2-methyl-2,4-pentanediol, 2,5-hexanediol, 2,4-heptanediol, 2-ethyl-1,3-hexanediol, diethylene glycol, dipropylene glycol, hexanediol, octanediol, triethylene glycol, tripropylene glycol and glycerol.

Suitable monoalkyl ethers of polyols may be:
ethylene glycol monomethyl ether,
ethylene glycol monoethyl ether,
ethylene glycol monopropyl ether,
ethylene glycol monobutyl ether,
ethylene glycol monohexyl ether,
ethylene glycol monophenyl ether,
ethylene glycol mono-2-ethylbutyl ether,
diethylene glycol monomethyl ether,
diethylene glycol monoethyl ether,
diethylene glycol monopropyl ether,
diethylene glycol monobutyl ether,
diethylene glycol monohexyl ether,
propylene glycol monomethyl ether,
propylene glycol monoethyl ether,
propylene glycol monopropyl ether,
propylene glycol monobutyl ether,
dipropylene glycol monomethyl ether,
dipropylene glycol monoethyl ether and
dipropylene glycol monopropyl ether.

Suitable esters may be: diethyl carbonate, ethylene carbonate, propylene carbonate, methyl acetate, ethyl acetate, gamma-butyrolactone, gamma-valerolactone, n-propyl acetate, isopropyl acetate, n-butyl acetate, isobutyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate,
ethylene glycol monoethyl ether acetate,
diethylene glycol monomethyl ether acetate,
diethylene glycol monoethyl ether acetate,
diethylene glycol mono-n-butyl ether acetate,
propylene glycol monomethyl ether acetate,
propylene glycol monoethyl ether acetate,
propylene glycol monopropyl ether acetate,
propylene glycol monobutyl ether acetate,
dipropylene glycol monomethyl ether acetate,
dipropylene glycol monoethyl ether acetate, glycol diacetate,
methoxytriglycol acetate, ethyl propionate, n-butyl propionate, isoamyl propionate, diethyl oxalate, di-n-butyl oxalate, methyl lactate, ethyl lactate, n-butyl lactate, n-amyl lactate, diethyl malonate, dimethyl phthalate and diethyl phthalate.

Suitable ethers may be: dipropyl ether, diisopropyl ether, dioxane, tetrahydrofuran, tetrahydropyran, ethylene glycol dimethyl ether, ethylene glycol diethyl ether, ethylene glycol dipropyl ether, propylene glycol dimethyl ether, propylene glycol diethyl ether, propylene glycol dipropyl ether, diethylene glycol dimethyl ether, diethylene glycol diethyl ether and diethylene glycol dipropyl ether.

Suitable ketones may be: acetone, methyl ethyl ketone, methyl n-propyl ketone, methyl n-butyl ketone, diethyl ketone, methyl isobutyl ketone, methyl n-pentyl ketone, ethyl n-butyl ketone, methyl n-hexyl ketone, di-1-butyl ketone, trimethylnonanone, cyclohexanone, 2-hexanone, methylcyclohexanone, 2,4-pentanedione, acetonylacetone, acetophenone, acetylacetone, 2,4-hexanedione, 2,4-heptanedione, 3,5-heptanedione, 2,4-octanedione, 3,5-octanedione, 2,4-nonanedione, 3,5-nonanedione, 5-methyl-2,4-hexanedione and 2,2,6,6-tetramethyl-3,5-heptanedione.

Particular preference is given to solvents selected from the group consisting of methanol, ethanol, 1-propanol, i-propanol, n-butanol, hexane, heptane, octane, isooctane, petroleum ether.

If the later process step of removing the liquid phase of the dispersion is to be effected by means of spray-drying, it is appropriate to use a volatile solvent or a mixture of volatile solvents. A volatile solvent is understood to mean one with an evaporation number of 50 or less, preferably 5 to 35. The reference used is diethyl ether with an evaporation number of 1.

The proportion of the solvent in the predispersion may be 50 to 98% by weight. The proportion is typically 60 to 95% by weight.

It is essential in the present invention to supply the predispersion to a high-pressure grinding. The high-pressure grinding can, for example, be performed in such a way that the predispersion is placed under a pressure of 50 to 500 MPa and decompressed through a nozzle, for example a hole or slot nozzle, the bore diameter or the slot width of the nozzle being 0.05 to 1 mm, preferably 0.1 to 0.5 mm, and the length/diameter ratio of the bore or the depth/slot width ratio of the slot of the nozzle being 1 to 10. In some cases, in this type of dispersion, a removal of coarse particles, for example by filtration or sedimentation, may be necessary.

Preference is given to an embodiment of the process according to the invention in which the predispersion is divided into at least two substreams, and the latter are placed under pressure and decompressed through one nozzle each to a common point of collision.

The jets of the substreams preferably have a speed of at least 300 $m \cdot s^{-1}$, more preferably one of 400 to 1000 $m \cdot s^{-1}$ and most preferably one of 600 to 900 $m \cdot s^{-1}$. Speed is understood to mean the speed of the substreams in the nozzle channel. This is defined as the quotient of volume flow per nozzle in $m^3 \cdot s^{-1}$ and area of the bore of a nozzle in $m^2$. The diameter of the bore is generally 0.1 to 1 mm, preferably 0.2 to 0.4 mm.

The process according to the invention further envisages the removal of the liquid phase of the dispersion. This can be done, for example, by distillation, filtration or centrifugation. The removal of the liquid phase need not be complete. Thus, the surface-modified silicon dioxide particles obtained by the process according to the invention may still have adhering solvent. If desired, a drying step may also follow. Equally, the particles obtained after the removal of liquid phase can be washed with suitable solvents and then removed, for example, by filtration or centrifugation.

Suitable processes for removing the liquid phase have been found to be spray-drying and freeze-drying. Good results are achieved especially in the case of spray-drying. In this case, the dispersion is sprayed by means of an inert gas through a nozzle into a heated drying chamber and volatile constituents are removed. In this embodiment, the dispersion used shall not comprise any nonvolatile constituents. As already stated at the outset, the liquid phase of the dispersion consists of volatile solvents having an evaporation number of 50 or less, preferably 5 to 35. These may preferably be hexane, heptane, octane, isooctane, petroleum ether mixtures, benzene, toluene, xylene, aromatics mixtures, methanol, ethanol, 1-propanol, i-propanol, 1-butanol and mixtures thereof.

The particles obtained after the removal of the liquid phase have a low tamped density, which is generally not more than 50% greater than that of the silicon dioxide particles used. For example, the tamped density after spray-drying a dispersion obtained after high-pressure grinding, which comprises fumed silicon dioxide which has been surface-modified with hexamethyldisilazane and has a BET surface area of 200 to 240 $m^2/g$, hexamethyldisilazane and ethanol, is only 55 g/l.

The invention further provides surface-modified silicon dioxide particles in the form of aggregates and/or isolated individual particles with in each case a mean particle diameter of at most 100 nm, which are obtainable by the process according to the invention. In this context, "redispersible" is understood to mean that the surface-modified silicon dioxide particles are incomparable into dispersions even at low shear rates, for instance by stirring (toothed disc).

The invention further provides for the use of the inventive surface-modified silicon dioxide particles in toner powders, silicone rubber, adhesives and scratch-resistant surface coatings.

EXAMPLES

A predispersion which contains 15% by weight, based on the predispersion, of AEROSIL® R812 S, Evonik Degussa, and 1% by weight of hexamethyldisilazane, based on AEROSIL® R812 S, in ethanol, is prepared by means of a dissolver. This predispersion is then divided into three substreams and placed under pressure, and the substreams are decompressed through a diamond nozzle to a common point of collision, the substreams each having an angle of 120° and a speed of 700 $m \cdot s^{-1}$.

The resulting dispersion has a median particle diameter of 86 nm.

The viscosity is, within the shear range from 0.1 to 1000 $s^{-1}$:

| Shear rate $s^{-1}$ | Viscosity (23° C.) $mPa \cdot s$ |
|---|---|
| 0.1 | 147.6 |
| 0.1374 | 68.13 |
| 0.1887 | 42.24 |
| 0.2593 | 27.73 |
| 0.3562 | 22.4 |
| 0.6723 | 19.25 |
| 0.9237 | 15.36 |
| 1.269 | 15.59 |
| 11.72 | 13.45 |
| 108.3 | 11.37 |
| 1000 | 9.052 |

The dispersion is subsequently spray-dried. The tamped density of the resulting particles is 55 g/l.

The particles are incorporated into ethanol by means of a dissolver. The mean particle diameter, at 88 nm, is virtually identical to the value obtained from the dispersion. This is accordingly a nanoscale redispersible powder.

The invention claimed is:

1. A process for preparing surface-modified silicon dioxide particles with a mean particle diameter of at most 100 nm, the process comprising:
   (I) high-pressure grinding of a predispersion comprising
   (A1) initial surface-modified silicon dioxide particles which (A1a) are at least partly aggregated, (A1b) are bonded to a surface-modifying component via Si—O—Si bonds, and (A1c) comprise reactive groups on their surface after the grinding,
   (A2) an organosilicon compound which has (A2a) a silicon-carbon bond and (A2b) a functional group which react with the reactive groups to form a covalent Si—O—Si bond, and
   (A3) an organic, volatile solvent,
   to form a dispersion; and
   (II) removing a liquid phase of the dispersion by spray drying, to obtain the surface-modified silicon dioxide particles with the mean particle diameter of at most 100 nm,
   wherein a proportion of the organic, volatile solvent (A3) in the predispersion is from 60 to 98% by weight.

2. The process of claim 1, wherein the initial surface-modified silicon dioxide particles (A1) are of pyrogenic origin.

3. The process of claim 1, wherein a proportion of the initial surface-modified silicon dioxide particles (A1), based on the predispersion, is 1 to 50% by weight.

4. The process of claim 1, wherein the organosilicon compound (A2) is a silylamine.

5. The process of claim 1, wherein a proportion of organosilicon compound (A2), based on the surface-modified silicon dioxide particles (A1), is from 0.01 to 10% by weight.

6. The process of claim 1, wherein the high-pressure grinding (I) is carried out in such a way that the predispersion is divided into at least two substreams, and the substreams are placed under pressure and decompressed through one nozzle each to a common point of collision.

7. The process of claim 6, wherein jets of the substreams have a speed of at least 300 $m \cdot s^{-1}$.

8. The process of claim 1, wherein the solvent (A3) consists essentially of methanol, ethanol, acetone, methyl ethyl ketone, 1-propanol, i-propanol, n-butanol, hexane, heptane, isooctane, petroleum ether, dipropyl ether, diisopropyl ether, tetrahydrofuran, tetrahydropyran, methyl acetate, ethyl acetate, or a mixture thereof.

9. The process of claim 1, wherein the surface-modified silicon dioxide particles have a BET surface area of 80 to 400 $m^2/g$.

10. The process of claim 1, wherein the surface-modified silicon dioxide particles have a BET surface area of 150 to 350 $m^2/g$.

11. The process of claim 7, wherein the jets of the substreams have a speed of at least 400 to 1000 $m \cdot s^{-1}$.

12. The process of claim 6, wherein the jets of the substreams have a speed of at least 600 to 900 $m \cdot s^{-1}$.

13. The process of claim 1, wherein a tamped density of the surface-modified silicon dioxide particles is at most 50% greater than a tamped density silica of the initial surface-modified silicon dioxide particles.

14. The process of claim 1, wherein a proportion of the organic, volatile solvent (A3) in the predispersion is from 60 to 95% by weight.

15. The process of claim 1, wherein the surface-modified silicon dioxide particles have a methanol wettability of 20 to 90.

16. The process of claim 1, wherein the surface-modified silicon dioxide particles have a methanol wettability of 40 to 80.

17. The process of claim 7, wherein the predispersion is placed under a pressure of 50 to 500 MPa and decompressed through a nozzle, wherein the nozzle has a bore diameter or a slot width of 0.05 to 1 mm, and wherein the nozzle has a bore with a length/diameter ratio, or a slot with a depth/slot width ratio, of 1 to 10.

* * * * *